July 1, 1952 T. H. HOLZER 2,601,990
THREE-POSITION, FOUR-WAY SELECTOR VALVE
Filed Aug. 2, 1950 3 Sheets-Sheet 1

THEODORE H. HOLZER
INVENTOR.

BY
ATTORNEY.

July 1, 1952        T. H. HOLZER        2,601,990
THREE-POSITION, FOUR-WAY SELECTOR VALVE
Filed Aug. 2, 1950        3 Sheets-Sheet 2
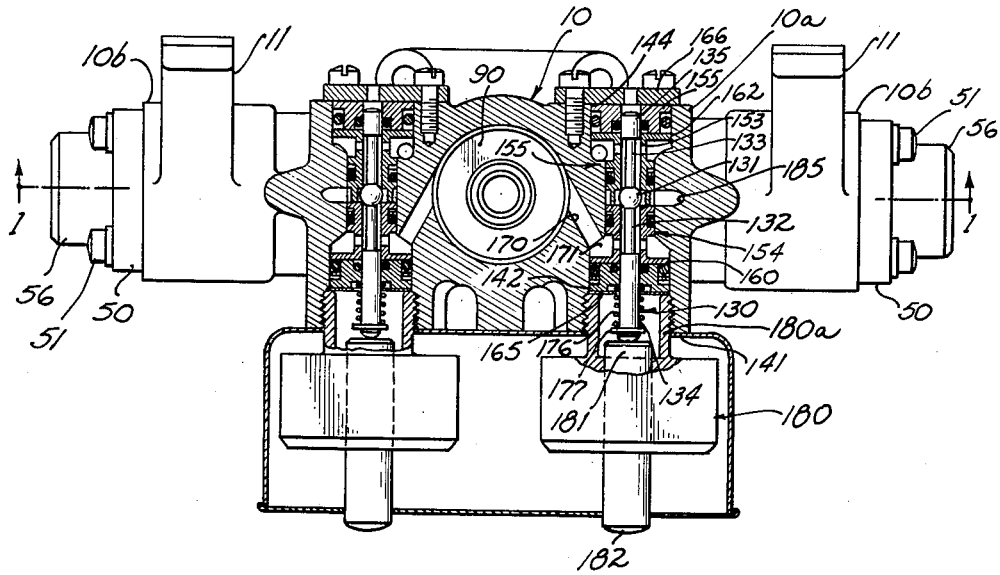
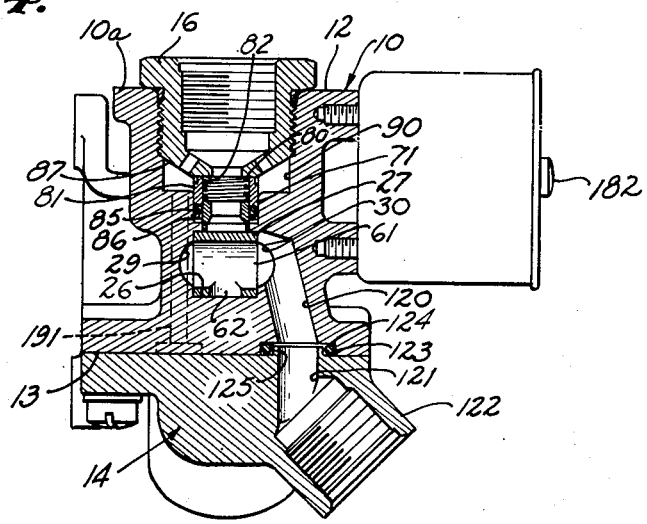
THEODORE H. HOLZER
INVENTOR.
BY
ATTORNEY.

July 1, 1952  T. H. HOLZER  2,601,990
THREE-POSITION, FOUR-WAY SELECTOR VALVE
Filed Aug. 2, 1950  3 Sheets-Sheet 3

THEODORE H. HOLZER
INVENTOR.

BY *Forrest J. Lilly*
ATTORNEY.

Patented July 1, 1952

2,601,990

UNITED STATES PATENT OFFICE 2,601,990

THREE-POSITION, FOUR-WAY SELECTOR VALVE

Theodore H. Holzer, Glendale, Calif., assignor to Saval Division of The William R. Whittaker Company, Ltd., Los Angeles, Calif., a corporation of California Application August 2, 1950, Serial No. 177,180

2 Claims. (Cl. 277—20)

This invention relates generally to fluid valves, and more particularly to fluid valves operating on high pressure fluid, as used in modern aircraft control systems, e. g., 3000 p. s. i.

The present invention is directed, in one principal aspect, to a selector or control valve of a type employing a ported valve element equipped with a known type of spring actuated axially movable ring seal engaging a lapped surface of the ported valve element surrounding the high pressure entrance ports thereof. The ported valve element in this general type of valve has sometimes been constructed for rotation, and sometimes for linear translation. The ring seals, protected against leakage around their outsides by synthetic rubber O-rings, very successfully seal against leakage of fluid even at high pressures. However, the effort to move these valves when using high pressure fluids becomes very considerable, and it is accordingly one object of the present invention to provide a selector valve of the type mentioned having an easily operable pilot valve for controlling the hydraulic fluid to move the main valve. Further objects include the provision of an improved pressure balanced pilot valve, and the provision of a main valve so constructed and arranged and so equipped that it is easily and readily operated by pilot-controlled hydraulic means.

Valves of the type under consideration are commonly of the four-way type, though modified forms may be of the three-way or two-way types. Four-way valves of this general type may be employed, for example, where it is desired to direct the flow of high pressure hydraulic fluid from either one of two engine driven hydraulic pumps to either one of two hydraulic systems in an airplane, or from a single pump or pressure source to either end of a double acting cylinder or cylinders, while at the same time permitting the fluid from the other end of the cylinder to flow through the valve into a return line and back to the reservoir.

It is a purpose and a feature of the present invention that the pilot valve be controllable by electrical solenoid actuation, and it is a feature and characteristic of the valve of the present invention, in one of its principal forms, that the valve will not "dump" system pressure in the case of an electrical failure, as is the case with some valves of the prior art. The main valve element of the invention returns to a central neutral position in the event of either electrical or hydraulic failure, and in one preferred form of the invention, the high pressure fluid at such time is cut off and held, while at the same time, the two "work" or "cylinder" ports are also sealed off, so that the fluid is held in the two ends of the work cylinder. In another embodiment, the two ends of the work cylinder are connected to the "return" line upon the main valve moving to neutral position, which it will do upon either electrical or hydraulic failure. A choice is thus had as to whether, upon electrical or hydraulic failure, the fluid in the work cylinder is retained or released.

A further object is the provision of a pilot controlled selector valve which will operate, not only at high pressure such as 3,000 p. s. i., but down to as low as say 240 p. s. i., so that the valve remains operable even with considerable failure of hydraulic pressure.

A still further object is the provision of a pilot operated selector valve which is operable between the control positions in an extremely short interval of time, as for instance, within $\frac{1}{10}$ of a second or less.

A further object is the provision of a valve of the general character mentioned, having a simple and straight-forward design throughout both pilot and main valve units, assuring satisfactory operation and long life, as well as having the features of compactness, quick, positive positioning of both pilot and main valve, giving very sensitive control of the power cylinder, and ease of installation in a hydraulic control system.

The main valve unit in a present preferred embodiment employs a ported slide type of valve, equipped with axially movable spring pressed ring seals engaging lapped surfaces surrounding the ports in the slide member. This slide member is of rectangular cross-section, and is accurately and closely fitted inside a broached passageway of similar cross-section in the valve body. Positioning of the valve is directly controlled by means of floating pistons engaging opposite ends of the slide valve and which react to pilot controlled hydraulic pressure for movement to either selected position or to a neutral position determined by centering springs acting on the said pistons and taking over control when the pilot controlled hydraulic pressure fluid is cut off.

The valve is equipped with two solenoid operated pilot valves, each employing a small pressure balanced spherical poppet to direct the pressure fluid from the main inlet pressure port to the floating work pistons at the two ends of the main slide valve. This spherical poppet valve element seals at either of two seats which are situated to allow a poppet stroke of the order of .020" to admit fluid under pressure or to allow the pressurized fluid to escape. Each pilot valve, in the normal (solenoid de-energized), is spring-loaded against its pressure seat, with the opposite seat open for venting work piston pressure chambers to the main valve return port. When either solenoid is energized, the corresponding spherical poppet instantly seals the return flow seat and admits fluid pressure to the corresponding work piston, causing the main slide valve to move to the selected position. This slide valve movement also compresses the springs at the opposite end so that when the solenoid is deenergized, the slide valve automatically returns to neutral.

The pilot valve of the invention also has utility employed as the main valve component in certain types of cut-off and three-way valves, as will be described in the course of the body of the specification.

The invention will be more fully understood by now referring to the following detailed description of certain present preferred embodiments thereof, reference for this purpose being had to the accompanying drawings, in which:

Figure 3 is a section taken on line 3—3 of Figure 1;

Figure 4 is a section taken on line 4—4 of Figure 1;

Figure 1:
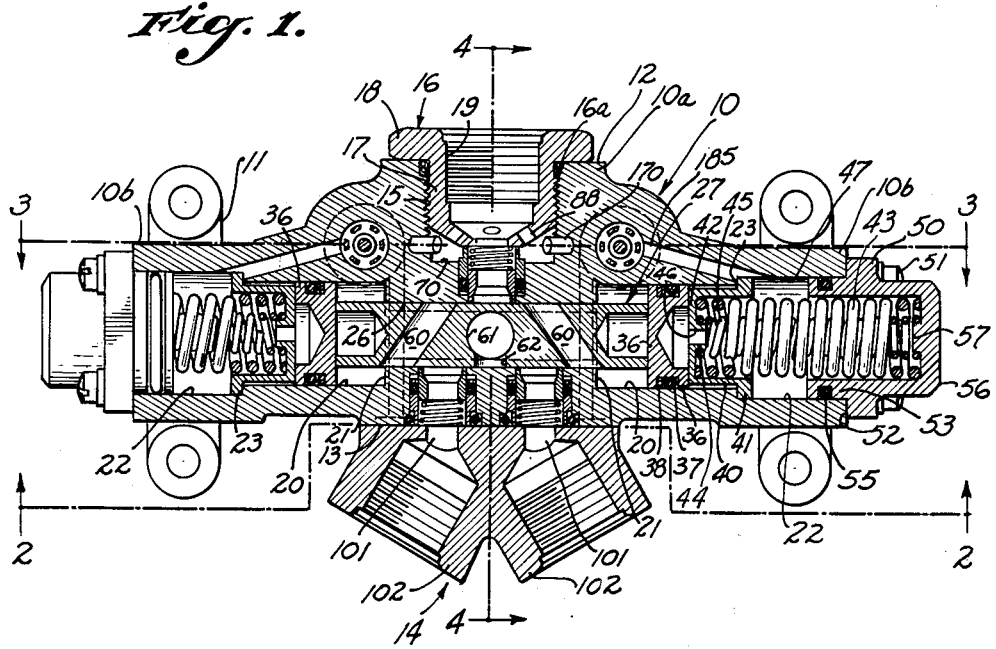
Figure 1 is a vertical longitudinal section of one present illustrative four-way embodiment of the valve of the invention, taken in accordance with the section line 1—1 of Figure 3, the main valve being shown in neutral position.
Figure 2:
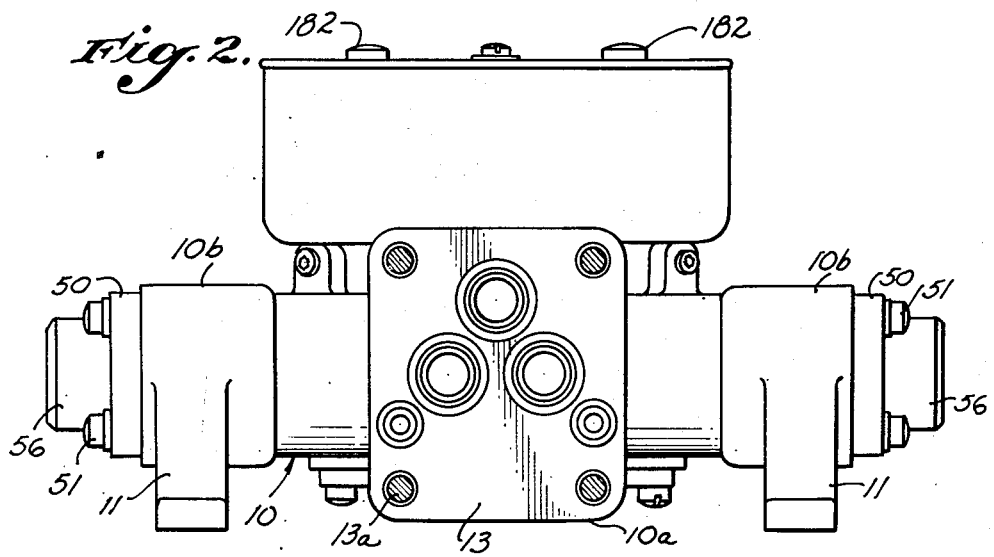
Figure 2 is a view taken as indicated by broken line 2—2 of Figure 1.

The invention will first be described as embodied in a four-way, three-position, pilot controlled selector valve whose main valve element is of a linear travelling slide type. It may be assumed for illustrative purposes that the valve will have four external pipe connections, one to the high pressure fluid source, two to opposite ends of a work cylinder, and a fourth to a return line leading to a fluid reservoir. This illustrative valve is shown in Figures 1–6, inclusive, to which reference is first directed.

In said Figures 1–6, number 10 designates generally a valve body, which includes a generally rectangular central body block portion 10a and axially alined tubular boss portions 10b projecting oppositely from body portion 10a. The latter are here shown as provided with integral wall-engaging mounting brackets 11, suitably perforated for mounting screws. The top and bottom of central body portion 10a are formed with flat horizontal surfaces 12 and 13, respectively, and a hydraulic connector fitting 14, hereinafter more particularly described, is secured against bottom surface 13, as by screws 13a, while a tapped bore 15 sunk into top surface 12 receives connector fitting 16. The latter has externally threaded wall 17 adapted for reception in threaded bore 15, and a hex head 18 at its outer end by which it is turned into position, and which ultimately shoulders against body surface 12 as a positioning stop. Fitting 16 is tapped as at 19 to receive conventional coupling means on the end of the high pressure pipe (not shown) through which the hydraulic pressure fluid is supplied. An O-ring seal at 16a seals against hydraulic leakage around fitting 16.

The tubular portions 10b of the valve body are formed with bores 20 extending inwardly to shoulders 21, and with enlarged counterbores 22 extending inwardly to intermediate shoulders 23. Extending between the two annular shoulders 21 is a preferably square or rectangular hole or guideway 26 for a main slide valve 27, formed of hardened steel, and having a corresponding square or rectangular cross-section. The guideway 26 is precision formed, preferably by broaching, and the valve 27 is precision machined and ground to fit the guideway 26 with very close tolerance, only sufficient working clearance being permitted to enable the necessary free sliding movement in the operation of the valve. The total clearance is of the order of .0005" to .001". The top and bottom surfaces of this valve member 27 are in addition lapped to an optically flat finish. Extending through the central body portion of the valve between annular shoulders 21 are semi-rounded grooves 29 and 30 (Figure 4), one on each of the slide valve 27. The grooves 29 and 30 are sunk into the otherwise flat side walls of the rectangular guideway 26, and they extend through the central body portion of the valve and open at their ends through the two annular shoulders 21. The slide valve 27, as will be seen in Figure 1, is of somewhat greater length than the distance between the two shoulders 21, so as to have an operative range of movement in either direction from the neutral centralized position illustrated in Figure 1. The limit of movement in either direction from the centered neutral position of Figure 1 is of course reached when the end of the slide valve reaches the corresponding shoulder 21.

Slidably fitted in bores 20 in back of the two ends of the slide valve 27 are freely floating pistons 36, each formed with a peripheral groove in which is seated a synthetic rubber O-ring 37 and a back-up or packing ring 38.

Outside of or in back of each of the pistons 36 is a tubular spring seat or retainer 40, the latter being freely receivable inside the bore 20 and having at its outer end an external annular positioning flange 41 slidably receivable inside the counterbore 22 and engageable against the annular shoulders 23. This spring retainer 40 has an inner end wall 42, forming a pocket for reception of the inner end of an outside coil centering spring 43, while a small tubular boss 44 projecting rearwardly from wall 42 forms a positioning means for an inside coil centering spring 45. A passageway 46 extending through the center of wall 42 and through boss 44 permits passage of hydraulic pressure fluid from the chamber 47 inside bore 22 to the piston 36.

The chambers 47 are closed at their outer ends by caps 50 secured to the tubular body members 10b as by screws 51. These caps 50 have annular shoulders 52 which engage the ends of the tubular body portions 10b, and have tubular projections 53 snugly received inside the bores 22, the latter being provided with external annular grooves fitted with O-rings 55 to seal against leakage to the outside from the pressure chamber 47. The rearward wall 56 of each of the caps 50 affords a seat for the coil springs 43 and 45, and a central boss 57 centers the inside spring 45, while the internal bore of the cap is such as to accommodate and center the larger outside spring 43. To prevent the turns of the small inside spring 45 from working in between the turns of the large outside spring 43, the two springs preferably have opposite pitch, as clearly illustrated in the drawings. The purpose of having the two springs, one inside the other, is simply to secure sufficient spring pressure and range of action within the space accommodation of the present design.

The main slide valve member 27 of the present valve is formed with a pair of longitudinally spaced, symmetrically located, oppositely inclined fluid bores 60 extending between its top and bottom faces, these bores inclining outwardly or away from one another in a downward direction. Valve member 27 also has a centrally located horizontal bore 61 extending between the two side surfaces thereof, and communicating at opposite ends with the two grooves 29 and 30 (Figure 4). A central bore 62 extends downwardly from bore 61 through the bottom surface of the valve 27.

The previously mentioned tapped bore 15 sunk into the top side of the valve body terminates at an annular shoulder 70, and extending downwardly from the latter is a reduced bore 71, the latter terminating at annular upwardly facing shoulder 72. Extending downwardly through this shoulder 72 is further reduced bore 73 which opens into the top of the guideway 26 for slide valve 27. Slidably received in the bore 73 and serving as a port for the hydraulic fluid is a shear seal ring 74 of hardened steel, externally cylindrical, having a narrow annular seating surface 75 at its lower end for engagement with the upper lap finished surface of slide valve 27, and having a wider seating surface 76 at its upper end. The lower seating surface 75 is ground and lapped to an absolutely flat surface. The opening at the lower end of this shear seal 74 is sufficient to accommodate the bores 60 of the slide valve when registered therewith. That is to say, when a given bore 60 is registered with the shear seal 74, the seating surface 75 of the shear seal will engage the upper surface of the slide valve all around the periphery of the bore 60, so as to accomplish the necessary seal.

The shear seal ring 74 is pressed downwardly into sealing engagement with the slide valve 27 by a coil spring 80 bearing on the upper end of the shear seal and confined within a sleeved member 81 located in bore 71. The inner end of fitting 16 engages the outer end of sleeve 81 and extends inwardly therefrom to afford an overhanging shoulder 82 against which the upper end of the spring 80 may bear. The shear seal ring is also pressed down against the valve 27 under hydraulic pressure, since its exposed upwardly facing area is greater than its exposed downwardly facing area. Located in the space between the lower end of sleeve member 81 and the shoulder 72 are an O-ring seal 85 and a back-up ring 86. Fitting 16 includes wall portion 87 formed with fluid ports 88, permitting the high pressure hydraulic fluid introduced through the fitting 16 to be not only passed downwardly via sleeve member 81 to and through the shear seal ring 74 to the ported main valve member 27, but also to pass through the ports 88 into the chamber 90 immediately above the shoulder 70, and this pressure fluid so introduced to the chamber 90 is utilized as presently to be described for the control of the pilot valves.

It will be seen that with the slide valve 27 in the neutral spring-centered position shown in Figure 1, the shear seal ring 74 will be spaced midway between the two ports 60, and the pressure fluid is accordingly cut off at that point. By means later to be described, the slide valve member 27 may be moved in either direction from the neutral position illustrated until the upper end of one or the other of the ports 60 is registered with the shear seal ring 74, and is therefore in communication with the hydraulic pressure fluid introduced through the inlet fitting 16. At such time, the lower end of such port 60 will register and communicate with a sealed bore 100 extending downwardly through the valve body to the lower body surface 13. There the bores 100 communicate with ports 101 in fitting 14 opening into tapped tubular bosses 102 adapted to receive coupling means to the fluid pipes leading to the two opposite ends of a work cylinder. The bores 100 open to guideway 26 through reduced bores 103, in which are slidably received shear seal rings 104, exactly similar to the previously described shear seal rings 75, and these shear seal rings 104 are pressed into sealing engagement with the bottom surface of valve 27 by coil springs 105 bearing on their lower ends and seated at the bottom on the coupling member 14, as shown. The coil springs 105 are confined inside sleeve members 106 placed inside bores 100 and arranged in overlapping relation with the lower ends of the shear seal rings, rubber O-ring seals and packing rings being placed around the shear seal rings 104, exactly as with the previously described shear seal 74. Rubber O-ring seals 110 are also placed in grooves or counterbores 111 sunk into valve body surface 13 around the bores 100 for protection against leakage at that point.

It will be seen that when the upper end of one of the ports 60 is registered with upper seal ring 74, with its lower end then registered with one of the lower seal rings 104, the port 62 in slide valve 27 will then be registered with the other of the lower seal rings 104. Hence, hydraulic fluid from the pressure source will at such time enter via upper fitting 16, pass through shear seal ring 74, thence downwardly through the registered port 60 to one of the lower shear seal rings 104, and on downwardly via the latter to and out through the corresponding coupling boss 102 to one end of the work cylinder. At the same time, fluid from the other end of the work cylinder will be returned via the other coupling boss 102 and will be passed upwardly through the corresponding shear seal ring 104 to slide valve port 62, then be in register with the last-mentioned seal ring 104. This return fluid is conducted from port 62 through transverse valve port 61 to channel 30 (Figure 4), whence it is received by a passage 120 leading downwardly from channel 30 through the valve body to communicate with a passageway 121 in coupling member 14, passage 121 opening into tapped tubular boss 122 into which the return or exhaust fluid pipe is understood to be coupled. For the purpose of sealing between passages 120 and 121, a rubber O-ring seal 123 is placed in a countersink 124 in the valve body around passage 120, and this O-ring is preferably centered by forming an annular ridge 125 on the coupling member 14 around passage 120.

Working in suitable guides mounted in the central block portion 10a of the valve body, on opposite sides of inlet fitting 16, are two parallel pilot valve plungers 130, each comprising a central spherical poppet valve head 131, reduced stems 132 and 133 extending in opposite directions from the head 131, and cylindrical plunger parts 134 and 135 on the ends of stems 132 and 133, respectively, the plunger parts 134 and 135 being of slightly less diameter than the spherical head 131. To provide for accommodation of the guides, seats and seals for these plungers, the valve body block 18a is formed with a bore 140 extending inwardly from its flat front side 141, a reduced intermediate bore 142 extending inwardly from bore 140, and a further reduced inside bore 143 extending inwardly from bore 142. The body is counterbored from the other side to form bore 144 of the same diameter as bore 142 extending inwardly to a juncture with bore 143.

Plungers 134 and 135 are slidably mounted in suitably bored glands 150 and 151, respectively, located in bores 142 and 144, respectively. The plungers 134 and 135 are also slidably fitted in tubular portions 152 and 153 of valve seat members 154 and 155, respectively. The seat member 154 has an inner cylindrical head portion 156 fitted inside bore 143, and peripherally grooved to receive an ordinary O-ring seal and back up ring, as illustrated. At its other end, the member 154 has an enlarged annular flange 160 received snugly within bore 142. The bore 152a of tubular member 152 is just slightly less than the diameter of spherical poppet valve 131, and the inner end of said bore confronts poppet valve 131 as indicated. Seat member 155 is a substantial duplicate of member 154, its tubular portion 153 having at the inner end a cylindrical head 161 fitted with an O-ring and back up ring the same as in the case of the head 156 of seal member 154, and the outer end of the member 153 carries annular flange 162 seated in bore 144. The bore 153a of tubular member 153 is slightly less in diameter than the diameter of spherical valve element 131, and confronts the latter in opposition to the bore 152a. It will be seen that the intersection of these bores 152a and 153a with the flat ends of the cylindrical heads 156 and 162 forms round, sharp seats s and s', respectively, for seating engagement with the spherical poppet valve element 131. The head 161 of seat member 155 has projecting spacer fingers 164 (see Figure 5) which engage the head 156 of seat member 154 and space the two valve seats s and s' apart for a pilot valve stroke of approximately .020".

The aforementioned glands 150 and 151 back up and engage the corresponding flanges 160 and 162 of the seat members. Gland 150 is confined by a shim 165 seated in bore 142, and gland 151 is confined by a cover plate 166 secured to the valve body. The peripheries of the two glands are grooved to receive rubber O-ring seals and back up rings as indicated, while the center bores of the glands are counterbored from their inner faces to receive O-ring seals in the manner clearly illustrated in the drawings.

A fluid passage 170 establishes pressure fluid communication from the previously mentioned source pressure fluid space 90 (see Figure 1) to an annular space 171 formed at the junction of bores 142 and 143, between the head of seat member 154 and its flange 160. Communication is established between space 171 and the interior of tubular member 152 by means of ports 172. Pressure fluid thus passes through bore 170, chamber 171, ports 172 and the space inside of tubular members 152 and around valve stem 132 to the poppet valve 131. The same pressure fluid acts in the opposite direction against plunger 160, so that the pressures are balanced and there is no net force from fluid pressure in either direction in the static condition with the poppet valve on its seat s. The poppet valve is normally maintained in sealing engagement with its seat s by means of a coil spring 176 surrounding plunger 134 and confined between the outer end of gland 142 and a retaining ring 177 mounted on plunger 134 near its outer end.

Actuation of the pilot valve is accomplished by pressing inwardly on the outer extremity of plunger portion 134 to move the plunger and its poppet valve 131 through the .020" stroke necessary to unseat the poppet valve from its seat s and to seat the same on the alternate seat s'. This can be accomplished manually, but is preferably accomplished by a suitable solenoid. A solenoid is conventionally indicated at 180, being shown to have a plunger 181 understood to be advanced into operative engagement with plunger 130 when the solenoid is energized. It will be understood that upon de-energization of the solenoid, its plunger 181 will retract and release the pilot valve plunger 130 for return under the influence of its spring 176. To provide for manual actuation even when having the solenoid installation, the solenoid may have an extending push button device such as indicated at 182. The two solenoids for the two pilot valves may be housed in a suitable casing, understood to be secured properly to the face 141 of the valve body. The solenoids are shown to have tubular bosses 180a screwed into tapped bore 140. These valve operating solenoid devices form no part of the present invention, and are hence only conventionally shown herein. It will be understood, however, that in connection with the two solenoids, an electric power circuit will be provided and also a three-position switch providing for energization of either solenoid (but not both together), and for de-energization of both together. It will of course also be understood that any suitable alternative means may be adopted for operation of the pilot valve plungers 130, as required to meet various conditions.

Depression of the pilot valve 130 against its spring 176 in the manner indicated above results, as described, in unseating the poppet valve 131 from seat s and moving it to the opposed seat s'. This allows pressure fluid to escape from the bore of tubular member 152 past the poppet valve, whence it may flow outwardly between spacer fingers 164 to a fluid passageway 185 leading to the previously described hydraulic pressure fluid chamber 47 (see Figure 1).

As earlier described, in the absence of actuating forces, the main slide valve 27 is held in a centralized position between the two centering springs. Presence of hydraulic pressure fluid in a chamber 47 through actuation of the pilot valve as just described results in application of pressure fluid against floating piston 31, the fluid reaching the latter through the port 46 in the spring seat member 49. The floating piston 31 accordingly advances, pushing slide valve member 27 ahead of it against the opposed centering spring, until the piston 31 reaches the stop shoulder 21, at which position the slide valve member 27 has moved one of its fluid ports 60 into a position establishing pressure fluid communication between the ring seal 75 and a lower ring seal 104. At the same time, as earlier described, the return port 62 of the main valve registers with the other lower ring seal 104. Thus it will be seen that actuation of pilot valve plunger 130 sends pressure fluid from inlet fitting 16 past pilot poppet valve 131 and into chamber 47, from which it exerts pressure through floating piston 36 on the end of the main slide valve to move the same into a position where pressure fluid from the inlet fitting can travel down through a main valve port 60 to one or the other of the tapped pipe coupling bosses 102. Pressure fluid is thus delivered to one of the pipes connected to a tubular coupling boss 102, while at the same time return fluid will enter via the other coupling boss 102, and will be delivered via port 62, port 61, and passages 120 and 121 to the return pipe coupled into the boss 122 (Figure 4). The main slide valve will of course be moved in one direction or the other, depending upon which of the pilot valve plungers 130 has been actuated.

When the pilot valve plunger 130 is released, it returns under the influence of its spring 176 through its .020" stroke, poppet valve 131 separating from seat s' and again making sealing engagement with pressure fluid seat s. Main slide valve 27 will then be returned to its neutral center position by the previously compressed centering spring, thereby cutting off the pressure fluid at ring seal 74, and hydraulic fluid will be exhausted from chamber 47 through passage 185, and will flow past seat s' into the annular space between tubular member 153 and pilot valve stem 133. This fluid then flows through ports 190 in tubular member 153 just inside flange 161, to be received by a passage 191 extending downwardly and opening into groove 29 (Figure 4), whence it may travel along groove 29 to and into transverse slide valve port 61, to escape via passages 120 and 121 leading to "return." It may be noted that the grooves or channels 29 and 30 establish communication between the inner ends of the two bores 20, permitting fluid flow back and forth between these spaces to enable the movement of the pistons 36.

One particular feature of the main valve is the fact that the slide valve 27, with its close precision fit in the guideway, is actuated by but not rigid with, the floating pistons 36. This assures proper working of both slide valve and pistons, even though there be a little misalinement of the piston bores relative to the guideway for the main valve.

Attention is called to the fact that upon electrical failure, both pilot valves must necessarily occupy their neutral positions, and the main valve must return to centered position, cutting off the flow of source pressure fluid, and cutting off communication to both ends of the work cylinder. No hydraulic fluid is hence "dumped" as a result of electrical failure. However, since the solenoid plungers can be manually actuated, the system remains fully operative under manual instead of electrical control.

In the event of hydraulic source pressure fluid failure, the system both pilot and main valves, will return to neutral, the same as with electrical failure. However, while the system is designed for 3,000 p. s. i., the valve remains operative down to about 240 p. s. i.

It will be evident that the valve has the important feature of "non-interflow" between partially open ports in intermediate positions of the main slide valve. In other words, there are no intermediate positions of the slide valve at which hydraulic fluid can find an unintended path of communication between two valve ports.

Figure 7:
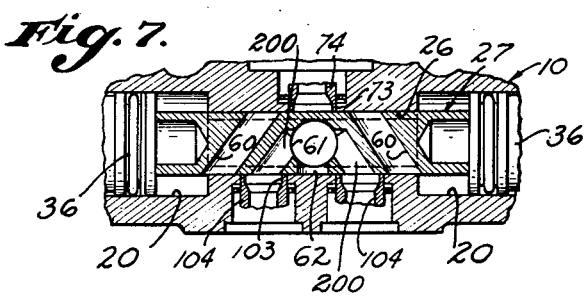
Figure 7 is a fragmentary detail view taken from Figure 1, but showing a modified porting arrangement for the main slide valve.
Figure 5:
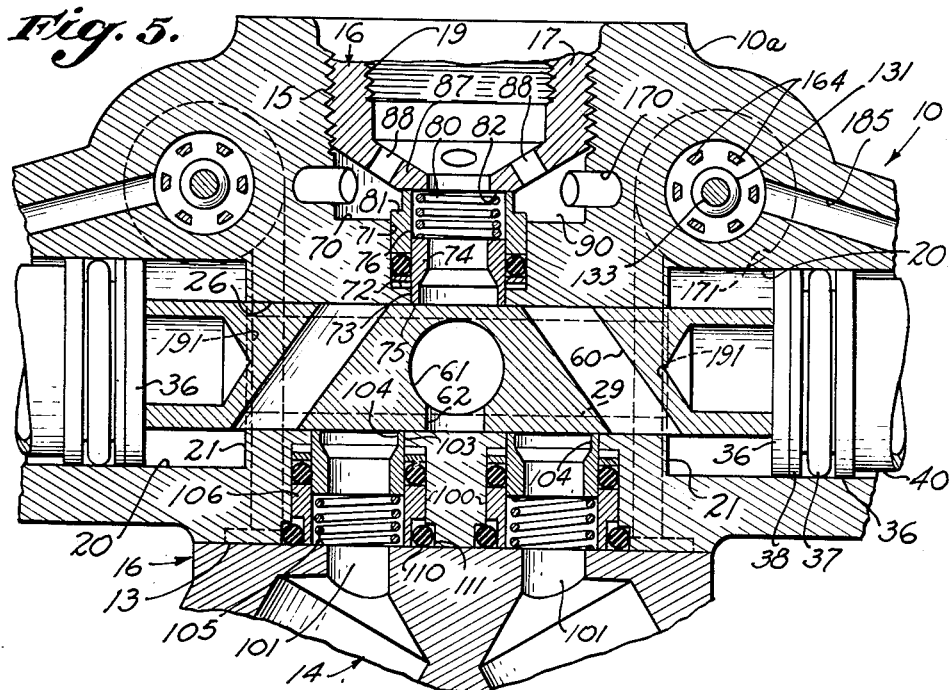
Figure 5 is an enlarged fragmentary view taken from Figure 1.

Figure 7 shows a modified porting arrangement for the main slide valve 27 of Figure 1. Here, there are two slanting ports 200, placed inside and substantially parallel to ports 60, positioned to establish communication between shear seal rings 104 and transverse slide valve bore 61 in the neutral position of the valve. Accordingly, in this modification, fluid is free to escape to "return" from both ends of the work cylinder when the main valve is in neutral position.

A further modification, unnecessary to illustrate, consists in using a main valve positioning spring at only one end of the slide valve, and a floating piston and pilot controlled means for applying pressure fluid thereto at only the other end of the slide valve. In neutral position, then, the slide valve is moved its full stroke in one direction by the positioning spring, and when the pilot valve is actuated, pressure fluid is delivered to the floating piston to move the slide valve against the spring in the opposite direction. The porting of the main slide valve and of the valve body may follow, in effect, the arrangements suggested in Figures 1 and 7, or may be as desired.

Also, the pilot valve of the invention may be used independently as a shut-off valve, either normally open, or normally closed. The pilot valve as shown in Figures 1 and 6 illustrates typically the use as a normally closed shut-off valve, since actuation of the plunger 130 against the influence of the positioning spring 176 results in displacing the spherical poppet valve 131 from its seat s, causing flow to take place past the valve 131 to be received by the passage 185.

Figure 6:
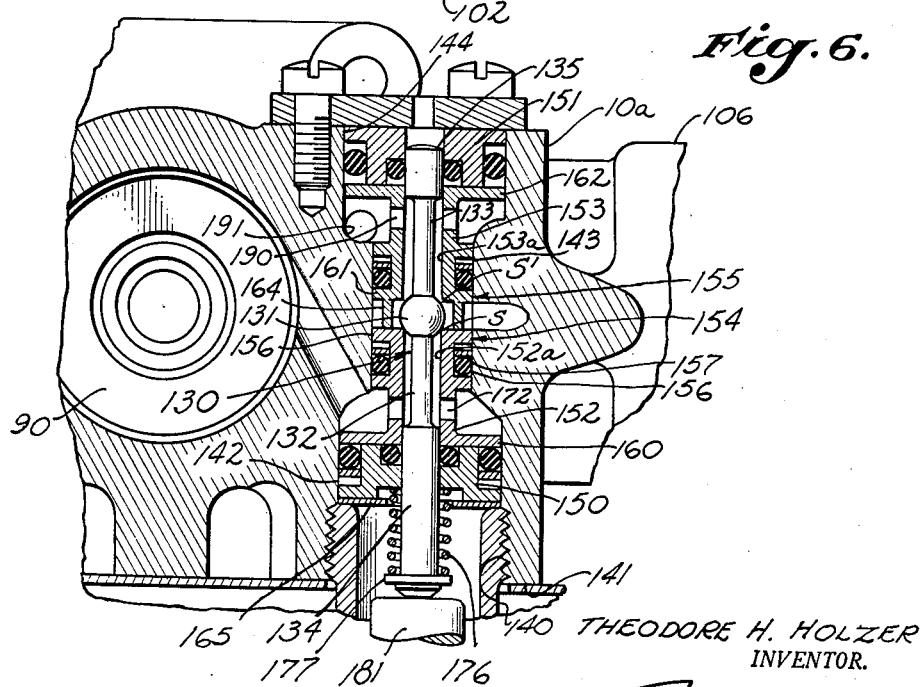
Figure 6 is an enlarged fragmentary view taken from Figure 3.

Also, the use of the pilot valve as a normally open shut-off valve is illustrated in Figures 1 and 6, when the return flow from the piston chamber 47 through passage 185 to the interior of seat member 155 is taken into consideration. There, the fluid is flowing past the spherical poppet valve 131 (then seated on seat s) into the bore of seat member 155, to be exhausted through ports 190 on its way to "return." If the valve actuating solenoid is energized, the spherical poppet 131 seats at s', shutting off any such flow into the bore of seat member 155. It should be evident how such a valve device may be employed as a fluid shut off valve in many situations.

It is of course to be realized that many modifications in design, structure and arrangement may be made in the valve without departing from the spirit of the present invention, and without departing from the scope of the appended claims.

I claim:

1. In a fluid valve, the combination of: a valve body, a hardened slide valve of rectangular cross-section, a guideway of corresponding rectangular cross-section, formed in said valve body and slidably receiving said slide valve with a close sliding fit, opposite faces of said slide valve having a precision finish, spring means for centering said slide valve in a neutral position in said guideway, pressure fluid means for moving said slide valve through a predetermined stroke in either direction against said spring means, a guide bore in said valve body opening into one side of said guideway to face one of said finished surfaces on said slide valve, a pair of guide bores in said valve body opening into the opposite side of said guideway to face the opposite finished surface on said slide valve, said pair of bores being spaced apart longitudinally of said guideway by a distance equal to twice the stroke of the slide valve in either direction from neutral position, external fluid openings in said body communicating with said bores, hardened sealing rings in said guide bores pressurally engaging said finished surfaces of said slide valve, a pair of ports through said slide valve extending between said finished surfaces thereof, said slide valve ports opening through said one of said finished surfaces on opposite sides of the first mentioned guide bore and at spacing distances therefrom equal to the stroke of the slide valve in either direction from neutral position, said slide valve ports opening through said opposite finished surface of said slide valve outside said pair of guide bores by center-to-center distances equal to said stroke of said slide valve, a fluid discharge passage in said slide valve opening at one end through said opposite finished surface on said slide valve at a point half way between said pair of guide bores, and opening at its other end through a side of said slide valve between said finished surfaces, a longitudinal groove in the wall of said guideway opposite said other end of said passage to receive fluid therefrom, and a discharge passage in said valve body leading from said groove.

2. The combination of claim 1, in which the slide valve has an additional pair of fluid ports located inside said first mentioned slide valve ports, said additional fluid ports opening through said opposite finished surface of said slide valve in positions to register with said pair of ring seals when the slide valve is in neutral position, and the other ends of said ports communicating with said longitudinal groove leading to said fluid discharge passage in the valve body.

THEODORE H. HOLZER.

REFERENCES CITED

The following references are of record in the file of this patent:

UNITED STATES PATENTS

| Number | Name | Date |
|---|---|---|
| 856,010 | Wikander | June 4, 1907 |
| 2,200,578 | Mahon | May 14, 1940 |
| 2,291,563 | Rotter | July 28, 1942 |
| 2,376,918 | Hughes | May 29, 1945 |
| 2,408,883 | Rode | Oct. 8, 1946 |